METHOD FOR SECURING PACKAGES IN A CARGO SPACE

Filed Oct. 23, 1967

Henry Sause, Jr.
INVENTOR
BY Kolisch & Hartwell
Attys.

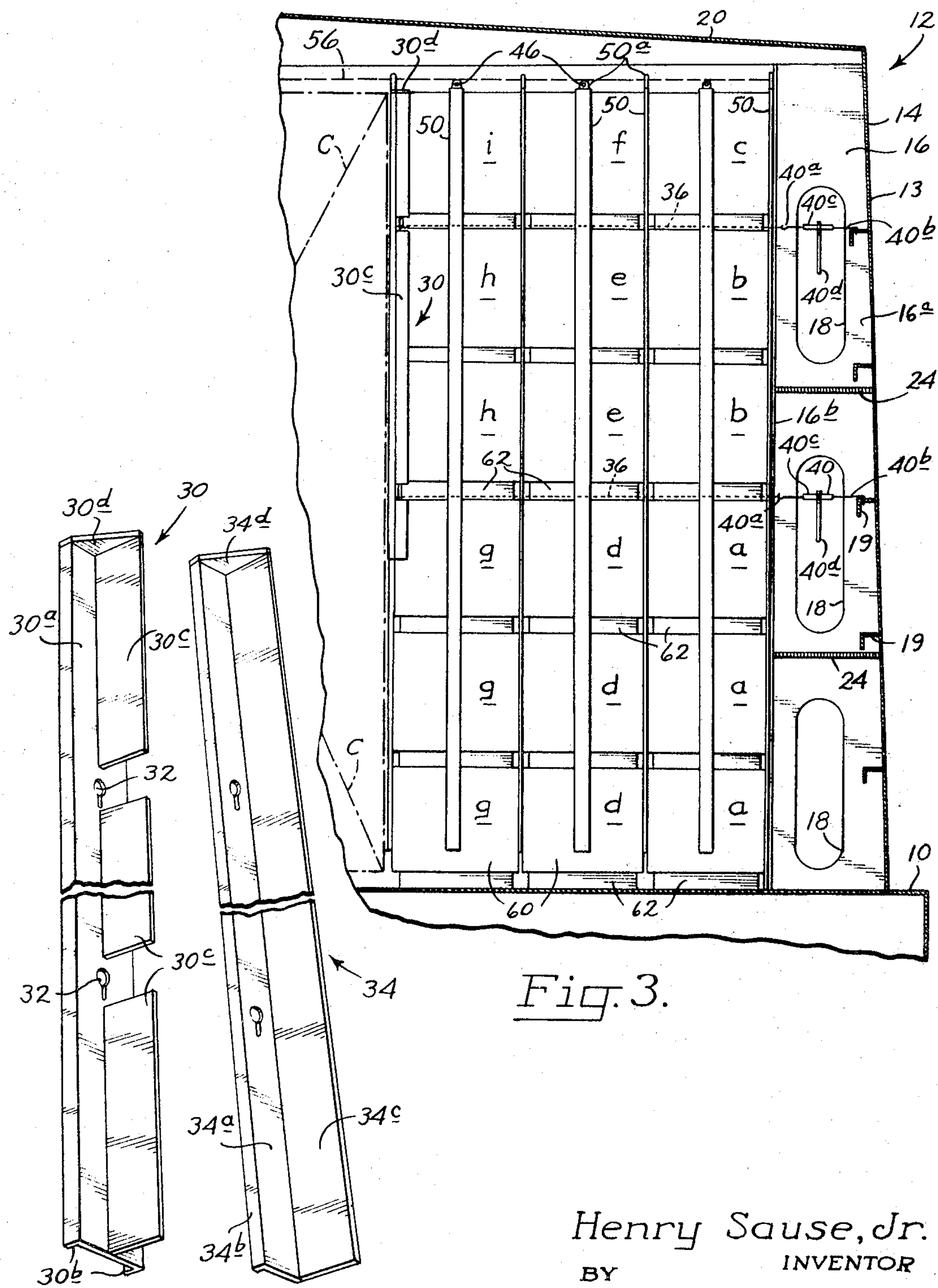
Henry Sause, Jr.
INVENTOR
BY Kolisch & Hartwell
Attys.

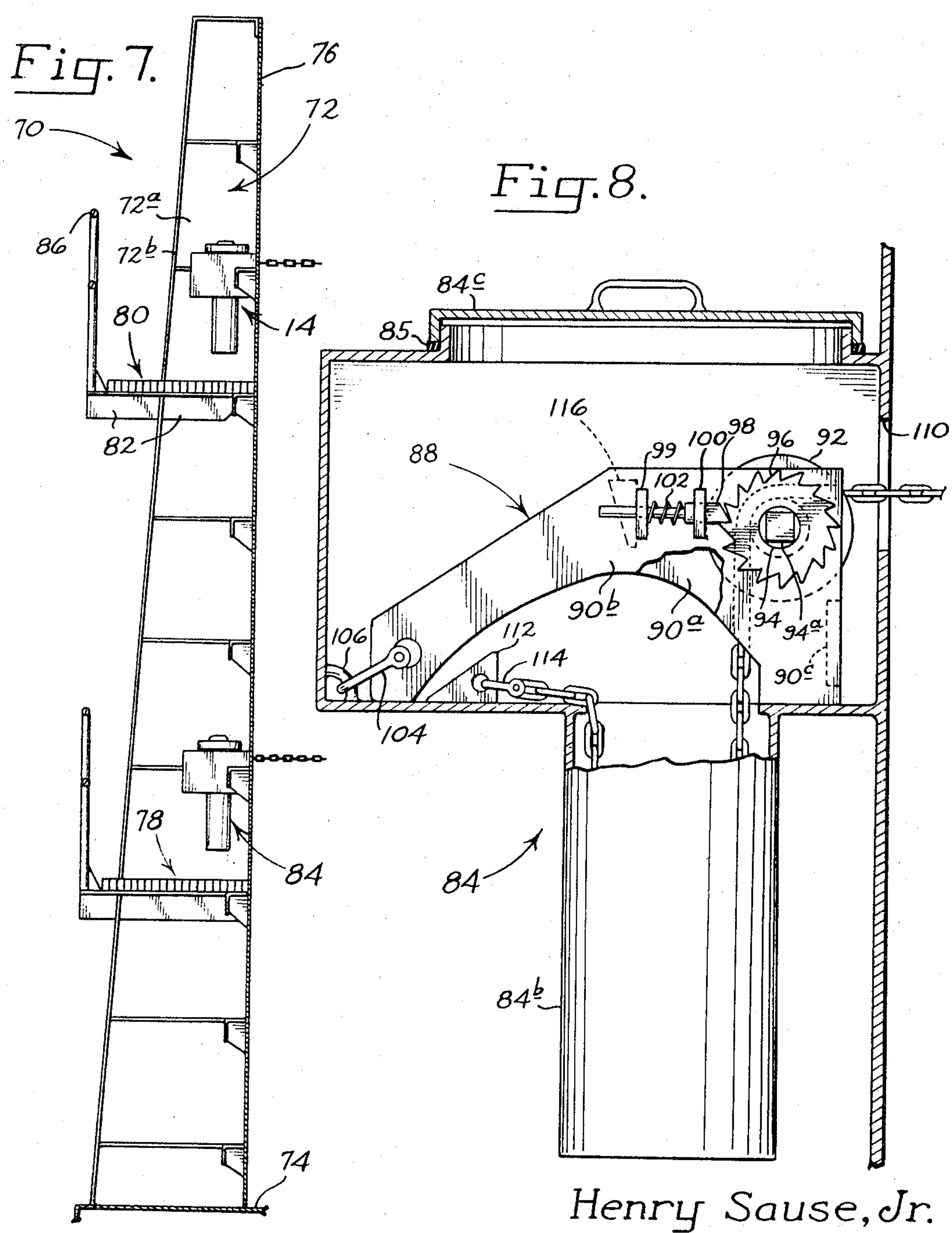
Henry Sause, Jr.
INVENTOR
BY
Kolisch + Hartwell
Attys.

Patented Apr. 8, 1969

3,437,222

METHOD FOR SECURING PACKAGES IN A CARGO SPACE

Henry Sause, Jr., 3829 NE. Flanders, Portland, Oreg. 97232

Filed Oct. 23, 1967, Ser. No. 677,119
Int. Cl. B65g *1/14, 1/20;* B65d *57/00*
U.S. Cl. 214—152 8 Claims

ABSTRACT OF THE DISCLOSURE

Apparatus and method for securing in a cargo space packages stacked in vertically extending tiers including tiers disposed one over another to form a column. The cargo space has a backing against which one side of a column of tiers of packages is placed. The apparatus includes a chain adapted to extend out normal to the backing in a space between tiers of packages in a column, an upright pressure bar adapted to abut an exposed side of a column and to be connected to one end of the chain, and a turnbuckle adapted to be connected to the other end of the chain at the rear of the backing, for drawing the pressure bar and chain toward the backing. Flexible dunnage belts are slidably and releasably depended from wires strung above the tiers, and are adapted to be inserted between adjacent columns.

This invention relates to a method and apparatus for securing packages for shipment in a cargo space.

In the shipping of packages, whether by truck, rail, air, or ocean-going vessel, there is usually some heeling and pitching movement of the cargo housing in which the packages are shipped, and thus a tendency for the packages to shift positions. To prevent such shifting and possible damage to the packages, and the structure housing the packages, it is desirable to secure the packages within the housing. Various methods for securing packages have been proposed in the past, but most have been unduly complicated or expensive.

A general object of the invention is to provide a novel method for securing packages against shifting within a cargo space which is rapidly and simply performed.

A related object is to provide novel apparatus by which the method may be practiced.

Another object of the invention is to provide a novel method for securing packages which allows maximum productive use of a cargo space.

More specifically, an object of the invention is to provide novel apparatus for securing packages stacked in a column of tiers, with one side of the column abutting a backing, the apparatus including pressure bars placed against the opposite side of the column and extending across tiers in the column, flexible tension-transmitting members connected at one set of ends to the pressure bars, and take-up means anchoring the other set of ends of the tension-transmitting members at locations disposed to the rear of the backing, to permit the columns of packages to be snugged between the pressure bars and the backing.

Included also within the objects of the invention are a novel construction for the pressure bars enabling them easily to be placed in proper position, a novel system for connecting the chains to the pressure bars permitting slack to be taken up in the chains, a novel system of dunnage belts permitting them readily to be positioned between adjacent columns of packages, and a novel organization for the mounting of chain take-up means in a region located to the rear of the backing.

These and other objects and advantages are attained by the invention, and the same is described below in connection with the accompanying drawings, wherein:

FIG. 3 is a cross-sectional view taken generally along the line 3—3 in FIG. 1;

FIG. 4 is a perspective view looking upwardly at a pressure bar of T-shaped cross section used in securing packages within the cargo housing;

FIG. 5 is a perspective view looking upwardly at another form of pressure bar having an essentially L-shaped cross section;

FIG. 7 is a slightly enlarged view, in cross section, of parts of a cargo housing according to a modification of the invention; and FIG. 8 is an enlarged view of structure for handling chain shown in FIG. 7.

Figure 1:
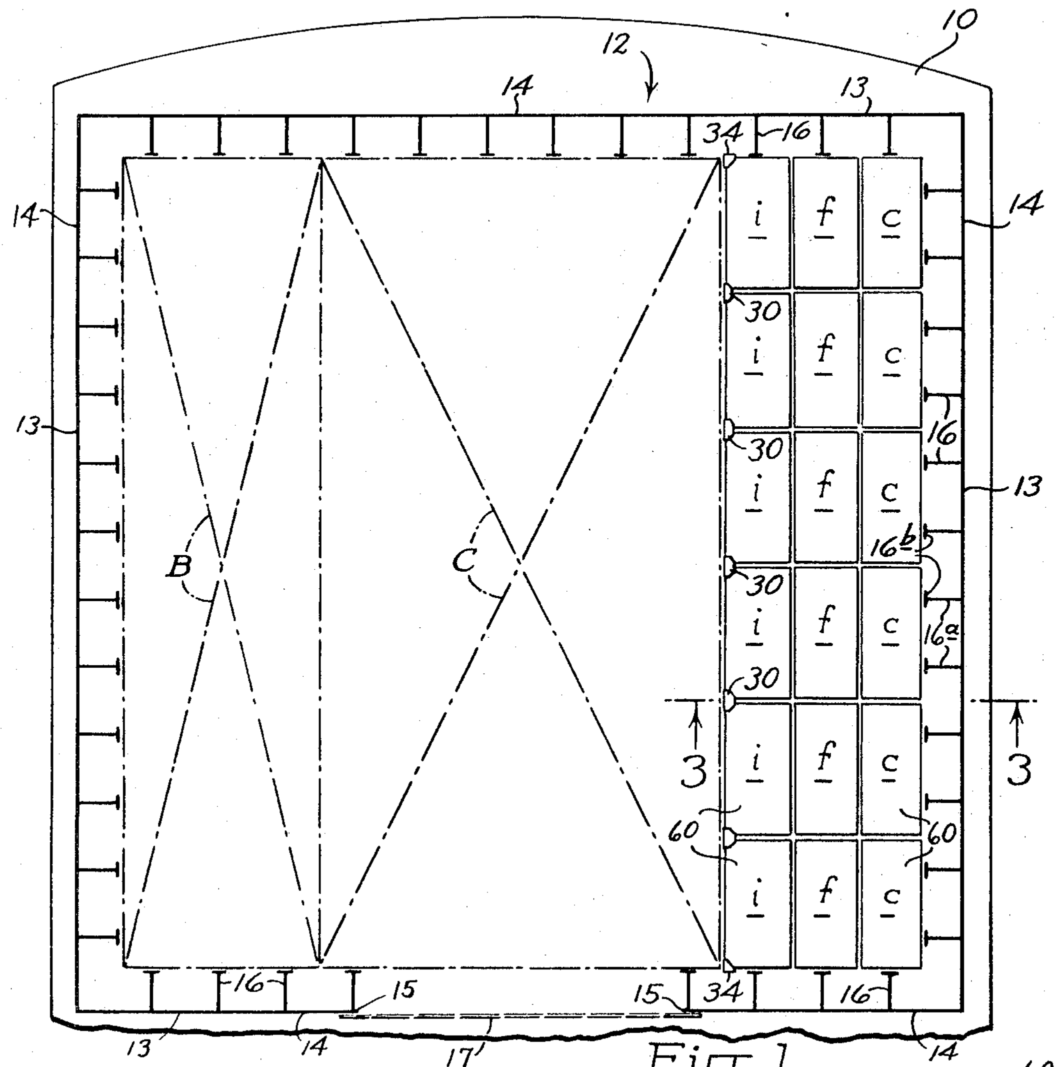
FIG. 1 is a top plan view of a cargo housing such as might be mounted on the deck of a barge or other cargo vessel, with the roof of the housing removed to illustrate the positioning and securing of a load of packages according to an embodiment of the invention.
Figure 2:
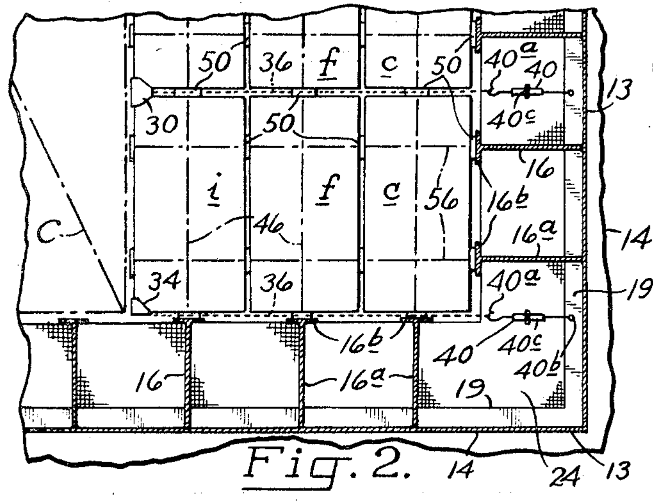
FIG. 2 is an enlarged detail of the lower right-hand corner of the cargo housing illustrated in FIG. 1.

Referring now to the drawings, and first more particularly to FIGS. 1, 2, and 3, at 10 is indicated a deck on a barge or other cargo vessel. A cargo housing shown generally at 12 is mounted on and projects upwardly from deck 10, and confines a cargo space within which packages may be placed for shipment with the deck providing a floor for such cargo space.

The cargo housing includes a series of bulkheads 14 which project upwardly from deck 10 and define a generally rectangular cargo space. An opening 15 is provided at one end of the cargo housing, to permit the movement of packages into and out of the cargo space. A weather-tight door (indicated in dashed outline at 17) is provided to close off opening 15 during shipment. The door may be supported by roof structure which has been removed in FIG. 1.

The bulkheads comprise multiple, elongated, vertically disposed pillars 16 secured at their bottom ends to the deck, and wall plates 13 joined to the outer sides of the pillars. Each pillar is of T-shaped cross-section and includes a flange portion **16*a* capped by an elongated expanse or portion 16*b*. The pillars are disposed about the deck with their flange portions facing outwardly and their expanses 16*b* facing inwardly. These expanses together function as a backing for columns of packages stacked thereagainst. As is seen in FIG. 3, flange portions 16*b* of the pillars have vertically spaced-apart access ports 18 provided therein to accommodate the passage of workmen. Elongated, horizontally disposed angle braces 19 are joined to the inner faces of the wall plates and extend between the flanges of adjacent pillars 16**.

A roof 20 (see FIG. 3) is supported on the upper ends of pillars 16 closing off the top of the cargo space.

As is best seen in FIGS. 2 and 3, horizontal sections of grating 24 are fastened in place between adjacent pillars. These sections are provided at two elevations, and in conjunction with access ports 18 provide two passage, or access ways, extending around the cargo space outwardly of expanses **16*b*** in the pillars.

According to this invention packages are stacked in tiers and these tiers are forced against expanses **16*b* of the pillars by pressure bars of the type illustrated in perspective in FIGS. 4 and 5. Considering the pressure bar 30 shown in FIG. 4, this may comprise an elongated member of substantially T-shaped cross section, including a plate portion 30*a* bounded along apposite side margins by flanges 30*b*. Extending longitudinally of the plate portion, substantially midway between its side margins, is a flange, or web, 30*c*** which is interrupted in regions spaced along its length. Topping the pressure bar is a support plate, or shoulder, 30*d*. It should be understood that the pressure bar has been considerably shortened in FIG. 4 by the removal of central portions in the bar. Apertures of keyhole shape 32 are formed in plate portion 30*a* in regions of the plate portion where web 30*c* is interrupted.

As will hereinafter be more fully described, the pressure bar is placed against the side of stacks of packages, with web 30*c* projecting inwardly between adjacent ends of side-by-side disposed packages. Shoulder 30*d* is designed to rest on the top of the stack and support the pressure bar, with the pressure bar depending downwardly from the shoulder. Tension-transmitting members or chains are passed through apertures 32, with the larger upper region of an aperture permitting the threading of a chain through the pressure bar and the lower region of an aperture snugly receiving a link in the chain when such link is turned to occupy a plane extending longitudinally of the pressure bar.

In FIG. 5 another pressure bar 34 is shown including plate portion 34*a*, a marginal flange 34*b*, a web 34*c* and shoulder 34*d*. The pressure bar is similar to pressure bar 30 and differs principally in that web 34*c* extends along a side margin of plate portion 34*a*, rather than midway between side margins as in the case of pressure bar 30. Pressure bar 34 is used in clamping packages where such packages form an end corner in a stack.

The securing apparatus of the invention further contemplates elongated tension-transmitting members, or chains, 36 used in drawing the pressure bars toward the pillars that are distributed along the sides of the cargo space. For reasons of clarity, such chains are shown schematically by dotted lines in FIGS. 2 and 3.

The chains are anchored to the bulkheads 14 through takeup means, such as the turnbuckles illustrated schematically in FIGS. 2 and 3 at 40. The turnbuckles are located outwardly, or to the rear, of expanses 16*b* of the pillars, whereby manipulation of the turnbuckles may be performed by a workman located in the passage, or accessways, defined by grating sections 24. As is best illustrated in FIGS. 2 and 3, each turnbuckle 40 may include a hook 40*a* at one end which is hooked through a link in a chain 36, whereby an end of the chain is anchored, and a hook 40*b* at its opposite end which is hooked through a suitable accommodating hole in an angle brace 19 to anchor the opposite end of the turnbuckle mechanism. A threaded sleeve 40*c* in the turnbuckle mechanism may be turned through manipulation of a handle 40*d* to draw the ends of the turnbuckle mechanism toward each other.

Referring specifically to FIG. 2, indicated by the parallel dashed lines 46 are elongated wires, or lines, extending longitudinally of the barge or vessel which are suitably secured in place within the cargo housing adjacent roof structure 20. These lines, as shown in FIG. 3, are employed in dependently supporting a series of dunnage belts, such as those shown at 50. Each dunnage belt, which may be a fabric element and is used to provide cushioning between side-by-side packages, includes a clip 50*a* at the top thereof slidably supported on a line 46 and holding a dunnage belt in its dependent position with respect to the line. The organization described permits the dunnage belt easily to be moved by a workman to a position where cushioning is desired between side-by-side disposed packages.

Again referring to FIG. 2, extending across the barge or vessel, and indicated by the dashed lines 56, is another series of lines also employed in dependently supporting dunnage belts of the type described. As is best shown in FIG. 3, lines 56 may extend between the sides of the cargo housing, above lines 46.

Figure 6:
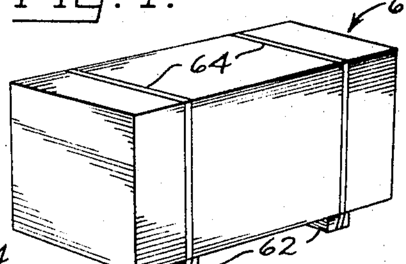
FIG. 6 illustrates a typical package of the type that might be handled as contemplated.

A typical package of the type that might be secured using the apparatus of the invention is illustrated in FIG. 6. Such package shown at 60, which might be a package of panels, is generally rectangular in shape and includes spacer elements 62 at the base of the package for supporting the remainder of the package at a slight elevation above the ground. Securing the package, including such spacer elements, together are bands or straps 64 which girdle the package between its ends.

Describing now how the apparatus may be employed using the method of the invention, a tier of packages may first be prepared along a side bulkhead 14 comprising a row of packages extending along the length of the cargo space, which row is three packages high. In FIG. 3, the packages which are visible in this tier are indicated by the reference letter *a*. Chains 36 are then draped over the top of this tier with the chains resting on top of the packages and extending across the tier at approximately the location of the adjacent ends of side-by-side disposed packages in the tier. During preparation of the tier dunnage belts are positioned where desired between adjacent side-by-side packages, with the belts being moved along lines 46 to be moved into proper position.

Another tier of packages may be assembled on the tier just prepared, with such other tier comprising a row which is two packages high extending along a side bulkhead. In FIG. 3 the packages in this tier are indicated by the reference letter *b*. Another series of chains may then be extended across the top of this tier with such chains substantially overlying the chains previously positioned. The chains previously positioned are free to be moved lengthwise between the two tiers of packages by reason of spacer elements 62 which provide a space between the first and second-formed tiers. To complete a column of packages extending along the side bulkhead a third tier comprising a row of packages extending along the side bulkhead which is one package high may be deposited on top of the second-prepared tier. The packages in this third tier are indicated in FIGS. 1 and 3 by the reference letter *c*.

With a column of packages comprising three tiers of packages thus prepared, another column of packages may be assembled directly inwardly of the first column and comprising a tier of packages containing packages indicated by *d* in FIG. 3, a tier of packages comprising packages indicated by *e* in FIG. 3, and a tier of packages comprising packages shown by *f* in FIGS. 1 and 3. After preparation of the tier containing packages *d*, the lower series of chains are pulled out and draped over the top of the tier, and, similarly, after the preparation of the tier of packages containing packages identified by the letter *e* the upper series of chains is pulled out to be draped over this tier.

To complete loading of packages along the right region of the cargo space another column of packages is prepared directly inwardly of the second-prepared column including packages *g*, packages *h*, and packages *i*. Where desired, dunnage belts on lines 56 are moved into place to provide proper cushioning between the packages in adjacent columns.

To secure the packages in the thus-formed columns firmly in place pressure bars 30 are arranged as shown in FIG. 1 with such extending vertically between adjacent stacks of packages in the outermost column. The shoulders 30*d* of these bars rest on the tops of the packages in the uppermost tier of packages in the column and webs 30*c* extend inwardly between adjacent ends of packages in the stacks. Pressure bars 34 are positioned to extend vertically along the corners of the assembled stacks which define the corners of the innermost column of packages.

In positioning the pressure bars, the chains are passed through the keyhole apertures described with links of the chains being moved into the reduced lower regions of the apertures to lock the chains in place after loose slack has been taken up. The chains may then be finally tensioned to draw the pressure bars firmly against the columns of packages with such being forced against expanses 16*b* of the pillars in the bulkhead through adjustment of turnbuckles 40. When such has been performed a fully stabilized condition is reached with the upper packages being drawn tightly against the side pillars. Lower packages are held in place by the weight of the packages which are lodged on top of them. In FIG. 3 the pressure bar illustrated is shown terminating somewhat short of packages resting on the deck, as in the usual instance it is not necessary to stabilize the lower packages through a side clamping effect. However, if desired, such pressure bars can be extended to encompass packages throughout the entire elevation of the column.

Having prepared three columns of packages along one side bulkhead in the cargo space, and referring to FIG. 1, a similar arrangement of packages may be prepared along the opposite side bulkhead of the cargo space in the region generally covered by the crossed dotted and dashed lines indicated by B. A central region, indicated by the crossed dotted and dashed lines C, remains after loading packages in region B. This central region can be fully loaded with packages through building or arranging successive columns of packages in the manner previously described, with successive columns being built up starting from the bulkhead 14 shown at the top of the page in FIG. 1 and progressing toward forward opening 15. In this instance, of course, the chains that extend across the column or tiers in the columns must have appreciable length as they must extend from the upper bulkhead 14 to end extremities which are in the region of opening 15.

With the cargo space fully loaded all packages in the space are clamped firmly in place. The method described has been employed in securing cargo transported by barges which typically, at one time or another, will run through severe weather. The cargo secured using the above-described method, however, has remained in place without damaging the cargo or the structure which houses it.

FIGS. 7 and 8 illustrate portions of a cargo housing of the type that might be included on the deck of a barge or other vessel constructed according to a different modification of the invention. In this form of the invention, the wall plates are positioned differently with respect to the pillars that support them, to obtain a more uniform outline in the cargo space provided within the housing. Further, the passageways whereby access is provided to the interior of the cargo housing, are somewhat different, and the take-up means for the tension-transmitting members is differently constructed.

Referring to FIG. 7, portions of the cargo housing are shown at 70 which includes, as in the first modification of the invention, pillars such as pillar 72 secured at their bottom ends to a deck 74. These pillars may also have a T-shaped cross section, and include a flange portion **72*a* joined to an elongated expanse or portion 72*b* which, in this instance, is located outwardly of the flange portion (rather than inwardly of it, as in the modification shown in FIGS. 1 through 5). Wall plates 76** forming a skin about the housing are joined to the inner margins of the pillars. With this construction, the cargo space bounded by the wall plates is uncluttered around the margin of the cargo housing, rendering it more easily cleaned and better adapted to handle cargo such as fungible goods.

Providing accessways extending around the cargo space is grating 78 provided at a level adjacent the base of the pillars, and grating 80 provided at a level which is nearer the top of the pillars. Such grating is supported on suitable structure such as brackets 82 joined to the pillars. The grating at each elevation includes a portion which extends in a zone outside the outer margins of the pillars, whereby a workman can walk along such grating about the outside of the cargo housing, and portions extending inwardly between the pillars to support a workman operating take-up means housed within casing structure shown at 84. Handrail structure along the outside of the two levels of grating is shown at 86.

According to the modification of the invention illustrated in FIGS. 7 and 8, the tension-transmitting members are tensioned by a take-up means 88 located on the outside of the wall plates. It is for this reason that casing structure 84 housing the take-up means is made watertight, to protect the take-up means which otherwise would be exposed to the weather.

Describing the casing structure generally, it includes an enlarged central portion **84*a* in which the take-up means proper is housed, a depending well portion 84*b* communicating with the interior of portion 84*a*, and a removable lid portion 84*c* with a seal 85 sealing it to the top of center portion 84*b*, which is removable to provide access to the interior of portion 84*a***.

Take-up means 88 comprises a frame including opposed frame members **90*a*, 90*b* laterally spaced apart from each other and suitably interbraced as by the brace shown at 90*c*. A chain sprocket 92 is mounted in the space between the frame members, secured to a shaft 94 journaled in the frame members and terminating in a squared end 94*a***. A suitable handle (not shown) terminating in a fitting adapted to fit over the squared end may be inserted by a workman down into the casing structure and about the squared end, and this handle may then be used to turn the sprocket to pull in any chain trained thereover.

Disposed on the outside of frame member **90*b* is a ratchet wheel 96 secured to shaft 94. A pawl 98 is engageable with the teeth of this ratchet wheel, the latter being slidably mounted in mountings 99 and 100. Spring 102 interposed between mounting 99 and the pawl urges the pawl into a position engaging the teeth of the ratchet wheel. The pawl and ratchet releasably lock the chain sprocket in a given position, inhibiting clockwise rotation in FIG. 8 of the chain sprocket with the pawl engaging the ratchet. The frame is anchored to the casing as through clevis 104 and anchor loop 106**, the latter being secured to the casing.

A chain or tension-transmitting member 108 used in binding a load in place extends into the interior of the casing structure through aperture 110. Its extreme end is anchored to an anchor strut 112 through a clevis 114. Portions of chain immediately adjacent the anchored extreme end are stored within well **84*b*** of the casing.

With the take-up means described it is a relatively easy matter for a workman quickly to draw on the chain to tense it, through turning of the chain sprocket. Extra chain pulled out of the cargo housing is stored in the casing well. Everything within the casing is protected from the weather by reason of the sealed lid portion which sits on top of the casing. Release of tension in the chain is readily done by inserting a wedge such as that shown in dashed outline at 116 into an accommodating aperture in a pawl, and striking the same, whereby the same acts to retract the pawl against the bias of spring 102.

In the modified form of cargo housing, as already mentioned, because the plates which form the skin defining the sides of the cargo space are on the inside of the pillars, the interior of the cargo housing is uncluttered and better adapted to handle cargo such as sugar, grain or other fungible goods. The modified form of structure also has the advantage of permitting movement of a workman to enable him to inspect the different chains while the cargo is in transit, to determine that the chains are properly tensed, without the workman having to go inside the cargo housing, which possibly could be dangerous if the vessel is going through heavy seas.

While there have been described various embodiments of the invention, and a particular procedure for loading a cargo space, obviously changes may be made in the structure employed and in the specific types and arrangements of packages without departing from the invention. It is desired to cover all such modifications of the invention as would be apparent to one skilled in the art and that come within the scope of the appended claims.

It is claimed and desired to secure by Letters Patent:

1. A method of securing multiple packages in a cargo space comprising arranging at least one tier of packages on the floor of the cargo space with a side of the tier laterally supported by a backing secured to and supported upon the floor, placing an elongated tension-transmitting member across the tier, arranging at least another tier of packages over the tension-transmitting member and on top of the first tier and with a side of said other tier against said backing, placing an upright pressure bar against the sides of the thus formed tiers opposite the sides which are against such backing, anchoring the tension-transmitting member at one point which is on said pressure bar and at another point which is behind said backing, and by shortening the effective length of the tension-transmitting member between the bar and backing drawing the bar toward the backing.

2. The method of claim 1, wherein the tension-transmitting member comprises a flexible member which is anchored at at least one point by means accommodating taking up of the member thus to shorten the effective length thereof.

3. The method of claim 2, wherein the tension-transmitting member is placed across the first tier while resting on packages in the first tier, and the other tier is placed on top of the first tier with vertical spacing provided between the tiers sufficient to accommodate movement of the tension-transmitting member.

4. The method of claim 1, wherein the tension-transmitting member comprises a flexible chain, and such is placed across the tier while resting on packages in the first tier, and the other tier is placed on top of the first tier with vertical spacing provided between the tiers sufficient to accommodate movement of the chain, and the chain is anchored at at least one point by means accommodating taking up of the chain.

5. The method of claim 4, wherein the pressure bar is apertured for the passage of chain therethrough and a detachable anchor connection is made with one of multiple links in the chain using said aperture, and the chain is anchored behind said backing by a take-up assembly which is activated to take up chain.

6. The method of claim 4, wherein another tension-transmitting member comprising a flexible chain is placed over and across the other tier, a third tier is placed over the other tier with vertical spacing provided between the other and third tiers to accommodate movement of the other chain, and the two chains are anchored at vertically spaced points to the pressure bar and at vertically spaced points behind said backing.

7. The method of claim 6, wherein the pressure bar is supported by and depended from the uppermost tier of packages.

8. The method of claim 7, wherein each tier comprises plural upright rows of packages at locations spaced outwardly to the front of the backing, and dunnage belts are moved along paths over the uppermost tiers of packages, and by so moving positioned in depending reaches between rows of packages in successive tiers.

References Cited

UNITED STATES PATENTS

| | | | |
|---|---|---|---|
| 2,606,670 | 8/1952 | Weaver | 214—10.5 |
| 2,760,445 | 8/1956 | Beckett. | |
| 3,067,699 | 12/1962 | Fredriks | 214—10.5 XR |

GERALD M. FORLENZA, *Primary Examiner.*

F. E. WERNER, *Assistant Examiner.*

U.C. Cl. X.R.

105—367, 369; 214—10.5